United States Patent [19]

Chabrerie

[11] 4,399,381

[45] Aug. 16, 1983

[54] HOMOPOLAR DYNAMOELECTRIC MACHINE

[75] Inventor: Jean-Pierre Chabrerie, Gif Chevry, France

[73] Assignee: Agence Nationale de Valorisation de la Recherche ANVAR, Neuilly-sur-Seine, France

[21] Appl. No.: 295,194

[22] Filed: Aug. 21, 1981

Related U.S. Application Data

[63] Continuation of Ser. No. 72,794, Sep. 5, 1979, abandoned.

[30] Foreign Application Priority Data

Sep. 7, 1978 [FR] France .............................. 78 25728

[51] Int. Cl.³ .......................................... H02K 31/00
[52] U.S. Cl. .................................... 310/178; 310/219
[58] Field of Search .............. 310/178, 219, 211, 232, 310/102 R, 102 A; 322/48

[56] References Cited

U.S. PATENT DOCUMENTS

| | | | |
|---|---|---|---|
| 1,916,256 | 7/1933 | Chandeysson | 310/178 |
| 2,832,910 | 4/1958 | Ringland | 310/178 |
| 3,211,936 | 10/1965 | Harvey | 310/178 |
| 3,229,133 | 1/1966 | Sears | 310/178 |
| 3,831,049 | 8/1974 | Korotenko | 310/178 |
| 3,846,653 | 11/1974 | Korotenko | 310/178 |

FOREIGN PATENT DOCUMENTS

| | | | |
|---|---|---|---|
| 110700 | 5/1900 | Fed. Rep. of Germany | 310/178 |
| 2420046 | 11/1975 | Fed. Rep. of Germany | 310/178 |
| 1286485 | 4/1961 | France | 310/178 |
| 2331895 | 6/1977 | France | 310/178 |
| 1298935 | 12/1972 | United Kingdom | 310/178 |

Primary Examiner—R. Skudy
Attorney, Agent, or Firm—Beveridge, DeGrandi and Kline

[57] ABSTRACT

In a homopolar dynamoelectric machine in which a magnetic flux moves across a generally cylindrical clearance space between the stator and rotor, counterproductive magnetic fields produced by axial electric currents are avoided by providing, on the mutually confronting surfaces of the stator and rotor, nonmagnetic electrical conductors which are electrically insulated from the magnetic portions of the stator and rotor. The conductors are connected together electrically by contacts, providing an electrically conductive loop which encloses no magnetic members. Leads from the electrically conductive loop may be connected to an external circuit.

The electrical conductors in one embodiment are of solid cylindrical shape, and in other embodiments are formed of spaced bars as in a squirrel cage. When spaced bars are used, the bars on one member are axially oriented and the bars on the other member are arranged in two sets which are equally but oppositely inclined to the machine axis.

The preferred structure has a clearance space in the form of two truncated cones, the small diameter ends of which intersect at the longitudinal center of the apparatus. The longitudinal ends of this space terminate in inwardly concave sections for an electrically conductive liquid metal. During starting, the entire clearance space in filled with liquid metal; and, during operation, liquid is expelled from the clearance space except for the concave sections.

7 Claims, 6 Drawing Figures

HOMOPOLAR DYNAMOELECTRIC MACHINE

This application is a continuation of application Ser. No. 72,794, filed Sept. 5, 1979, now abandoned.

BACKGROUND OF THE INVENTION

The invention is concerned with homopolar dynamoelectric machines with generally cylindrical clearances between the stator and rotor.

In conventional machines of this type, the armature current circulates in the bulky ferromagnetic material of the stator and the rotor. This creates an undesired orthoradial-magnetic field which becomes superimposed upon the two axial and radial components of the magnetic excitation vector created at all points of the stator and rotor by the induction windings of the device. The armature current in this type of machine may be several tens of thousands of amperes, and produces an armature-reaction magnetic field which is perpendicular and generally is from twenty to one hundred times more intense than the inductive magnetic field. This results in a magentic saturation of the material in a nearly orthoradial resultant direction, producing a considerable diminishment of the useful component of the magnetic induction, and considerably limiting the performance of the machine under load.

SUMMARY OF THE INVENTION

The purpose of the invention is to eliminate the preceding disadvantages by producing a homopolar dynamoelectric machine whose armature current does not produce a counterproductive magnetic flux.

The invention is applicable to homopolar machines which have a stator and a rotor separated by a generally cylindrical clearance space, and means for producing a magnetic flux which moves across the clearance space and through magnetic portions of the stator and rotor. According to the invention, the stator and rotor are provided with electrically conductive elements which are electrically insulated from the magnetic portions thereof. Electric contact means electrically connect the conductive elements of the rotor to the conductive elements of the stator to form an electrically conductive loop which has no magnetic element therewithin. The electrically conductive elements of the stator and rotor are similar to a squirrel cage structure in that they are formed of axially spaced continuous rings connected by radially spaced bars.

The invention also involves a number of preferred features and concepts described hereinbelow. The electrically conductive loop has a gap, the opposite sides of which are connected to electrical conductors which lead to a circuit external of the apparatus. The electrically conductive elements may be continuous, conductive walls located respectively at the internal and external peripheries of the stator and rotor; or, they may be spaced bars and continuous rings similar to a conventional squirrel cage. In the latter structure, the bars on the stator or those on the rotor are preferably arranged in two sets which have an equal but opposite inclination relative to the axis of the machine.

Preferably, the clearance space and the confronting surfaces of the stator and rotor have a reduced radius toward the center of their length, and have the form of two oppositely oriented truncated cones. The axial ends of the clearance space have internally facing concave sections adapted to contain a liquid metal which serves as the electric contact means between the stator and rotor. The disclosed concave sections are trapezoidal sections formed by a peripheral rib on the rotor and a corresponding groove on the stator. Means are provided for initially filling the clearances with liquid metal. When the rotor is rotating, metal is evacuated from the clearances except for the concave sections. In the disclosed embodiment, the liquid metal is evacuated through centrifugal overflow passages which lead from the clearance spaces near the edges of the concave sections.

Other features and aspects of the invention will appear in the following description of various embodiments taken as examples and illustrated in the annexed drawings.

BRIEF DESCRIPTION OF THE DISCLOSED EMBODIMENTS

Figure 1:
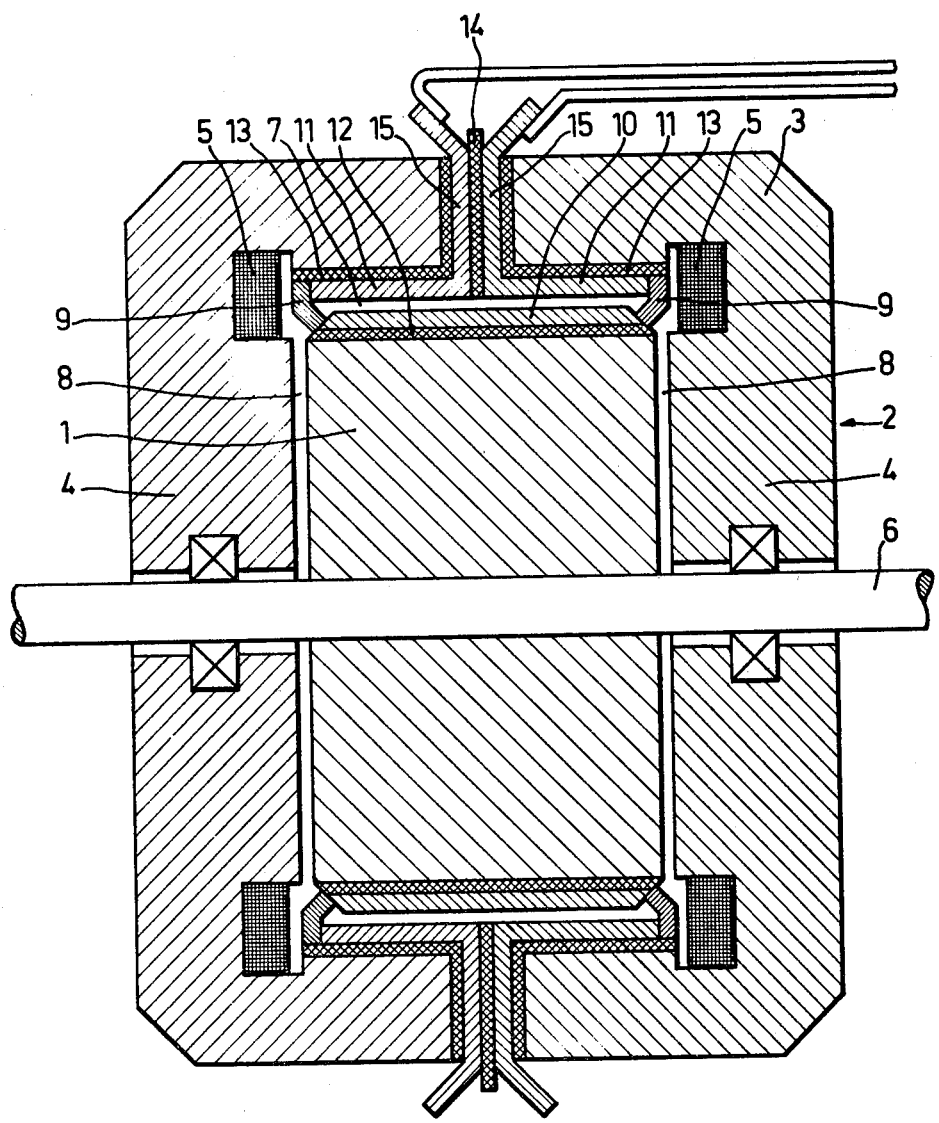
FIG. 1 is a generally schematic axial section of the simplest embodiment of the invention.

FIG. 1 shows the simplest embodiment of a homopolar dynamoelectric machine, operable as a motor or generator, wherein there is a cylindrical rotor 1 and a stator 2 formed of a peripheral part 3 and end plates 4. The members 1, 3 and 4 are formed of a material with high magnetic permeability. The apparatus includes inductive windings 5 which are coaxial with the shaft 6 and are energized to produce a large magnetic flux which flows in a magnetic circuit extending through the magnetic bodies 3 and 4 and radially across clearance spaces 7 and 8. Only the cylindrical clearance 7 is used for the electromagnetic effects, so two sliding contacts 9 are located at the opposite ends of the rotor 1 to enable electrical currents to flow axially in the rotor. These currents are extremely intense, creating a risk in prior machines of this type that orthoradial magnetic fields (perpendicular to the plane of FIG. 1) will be produced which are much larger than the useful field (in the plane of FIG. 1) produced by the inductors 5. Magnetic saturation may result, consequently weakening the useful inductive flux which produces the electromotive force of the machine.

To avoid the phenomenon mentioned in the preceding paragraph, there is a separate electrical circuit for the axially flowing current. This circuit includes elements 10 and 11 which are continuous, cylindrical, coaxial conductive walls which lie at the external periphery of the rotor and at the internal periphery of the stator. These elements 10 and 11 are nonmagnetic and highly conductive of electricity. They are electrically insulated from the magnetic portions of 1, 3 and 4 by layers of insulating material 12 and 13. The conductive element 10 covers the entire periphery of the rotor 1 and the conductive element 11 covers the entire inner face of the part 3 of the stator. The contacts 9 connect the conductive elements 10 and 11 to form an electrically conductive loop which is discussed below. At some location along its length, the element 11 has a gap 14, the opposite sides of which are connected to electrical conductors 15 which lead to an external circuit. Conductors 15 are insulated electrically from the magnetic stator portions by the insulating layer 13.

In the section shown in FIG. 1 it is seen that the electrical circuit through 15-11-9-10-9-11-15 is a loop which has no magnetic elements therewithin. In this loop, the lines of current fall back on themselves without enclosing any magnetic mass, thereby avoiding magnetic saturation at any point on the magnetic circuit. The FIG. 1 apparatus may be produced by cylindrically boring the stator and cylindrically machining the rotor periphery. The difference in the radii of these cylindrical surfaces minus the thickness of the parts 10, 11, 12 and 13 will be equal to the thickness of clearance space 7. However, the effective clearance space, i.e. the distance between the magnetic components of the apparatus which comprises a gap in the magnetic circuit is substantially greater since it includes the thicknesses of parts 10, 11, 12 and 13.

A disadvantage of the FIG. 1 embodiment is that the magnetomotive force required of the inductive windings 5 is essentially dependent upon the axial clearances 8 and the radial clearances between the magnetic portions of the stator and rotor. Clearances 8 can be reduced substantially within tolerances, but the radial distance between the magnetic portions of members 1 and 3 is much larger and cannot be reduced substantially since this distance includes the thicknesses of the conductive and insulating elements 10, 11, 12 and 13. It is known that, in order to produce a maximum induction which approaches saturation of the magnetic circuit, a certain number of ampere turns is required in the inductors 5. The required size of the windings 5 depends largely on the distance which must be bridged between the magnetic components and depends only slightly on the overall size of the apparatus. The FIG. 1 embodiment, with its continuous conductive walls leads to overdimensioning of the inductors, which is less important for large machines than for machines of moderate size.

The conductive elements 10 and 11 of the circuit may be made of electrolyte copper. If the machine is designed to rotate at high speeds which subject the conductive member 10 to high centrifugal forces, the member 10 may be formed of a copper alloy such as the alloy designated CRM 16X, manufactured by the Bronze Industrial de Bobigny company. It offers a mechanical resistance very superior to that of copper but an electrical resistivity which is slightly higher.

For homopolar machines of moderate power, the over-dimensioning of the inductors takes on a preponderant importance and can make such machines impractical. In that case, it is desirable to use a structure of the general type used in heteropolar machines, comprising spaced conductor bars connected to continuous electrically conductive end rings. This makes it possible to use the bore of the stator 3 and the periphery of the rotor 1 to provide an effective clearance space 7 of minimum thickness, without regard to the thicknesses of the conductors and the insulating layer. Longitudinal notches are made in both the rotor and the stator. Electrically conductive bars are inserted mechanically or by casting into the notches so that the confronting surfaces of the rotor and the stator have alternating magnetic portions and conductive portions on their peripheries.

In heteropolar machines, it is customary to incline the notches of the stator with respect to those of the rotor. The inclination is such that it corresponds, over the entire extent of the rotor, to a rotation of a slotted-armature step or of a multiple of that step. This ensures constancy of the magnetic resistance between the rotor and the stator. Since it is more difficult to machine helical grooves in the wall of a bore than on the circumference of a cylinder, it is customary and preferred to arrange the stator notches parallel to the axis and to dispose the rotor notches helically. This is particularly true where the rotor and the stator are bulky machined pieces rather than stacked laminae of sheet metal as in heteropolar machines.

If the rotor notches and the small electrically conductive bars seated in them are inclined uniformly as in a squirrel-cage rotor of a conventional asynchronous motor, the extremely intense currents passing through those small bars have, due to the inclination of the bars, an orthoradial current component. The magnetic field created by this current component opposes the field produced by one of the inductors 5 and reinforces the field produced by the second inductor.

Figure 2:
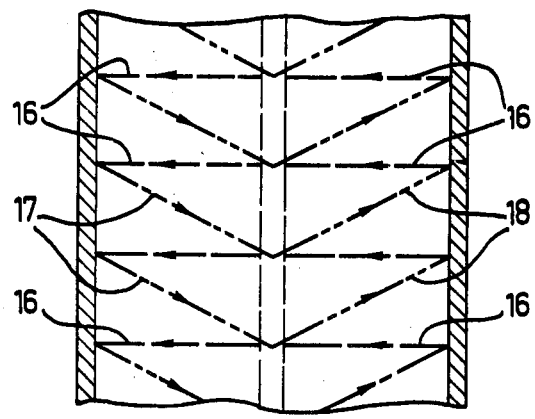
FIGS. 2 and 3 are diagrammatic evolute views of two variants of the invention in which the electrical conductors are arranged as small bars.
Figure 3:
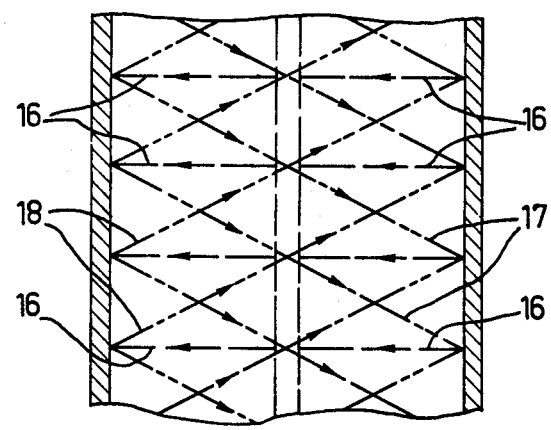

FIGS. 2 and 3 show two suitable arrangements of the notches and conductor bars. The stator notches 16 are parallel to the central rotational axis; and, the rotor notches and conductors are inclined with respect to this axis of the apparatus. To prevent disturbance of the magnetic field produced by the inductor, the present invention envisions the use of a second set of conductor bars 18 which have the same total cross section as the set of bars 17, and have an equal but opposite inclination. The conductors 17 and 18 can simply be placed side by side as shown in FIG. 2, which suffices to negate or cancel the ortho-radial current component. The two sets of bars 17 and 18 may also be superimposed as shown in FIG. 3.

Machines such as those depicted in FIGS. 2 and 3 may be constructed by machining oppositely inclined helical notches on the periphery of a bulky, soft iron, rotor cylinder and spray coating the internal walls of those notches with a ceramic or aluminous heat-resistant, electrical insulating substance. Molten aluminum, copper or bronze is injected into the notches, forming a cast assembly of small bars and their associated and conductive rings. The stator is made in the same way, but with straight notches. Alternatively, the rotor or the stator may be formed by stacking pieces of sheet metal of low coefficient of expansion. The use of such sheets reduces resistance losses, but it slightly increases the number of inductive ampere turns which are necessary to produce a given rotational torque.

When the rotor is expected to operate at a high rotational velocity, the notches and small bars may be designed to resist centrifugal force by providing the notches with an undercut shape. For example, a trapezoidal section may be used, the large base thereof being disposed radially inward to ensure the retention of the similarly configured conductor bars.

Despite its apparent simplicity, the magnetic circuit of the FIG. 1 apparatus has the disadvantage that every line of flux passes two clearances 7 and 8, while only the passage over clearance 7 is useful. The passage of the flux over clearance 8 is deleterious and it requires a bulky side plate 4 to conduct the magnetic flux. In lieu of this, the invention may be practiced with another well known magnetic circuit such as the one shown in FIG. 5. In this circuit, the clearance space is in two successive sections 7a and 7b along the axis. A single inductor 5 produces a radial magnetic flux which crosses both clearances 7a and 7b in opposite directions to complete the magnetic circuit. In this manner, the magnetic circuit is located exclusively in the periphery of the rotor 1 and the periphery of the stator 3. All lines of flux cross two useful clearances 7a and 7b and no deleterious clearances. The side plates 19 in FIG. 5 may be formed of nonmagnetic material since they do not carry the magnetic flux.

Figure 5:
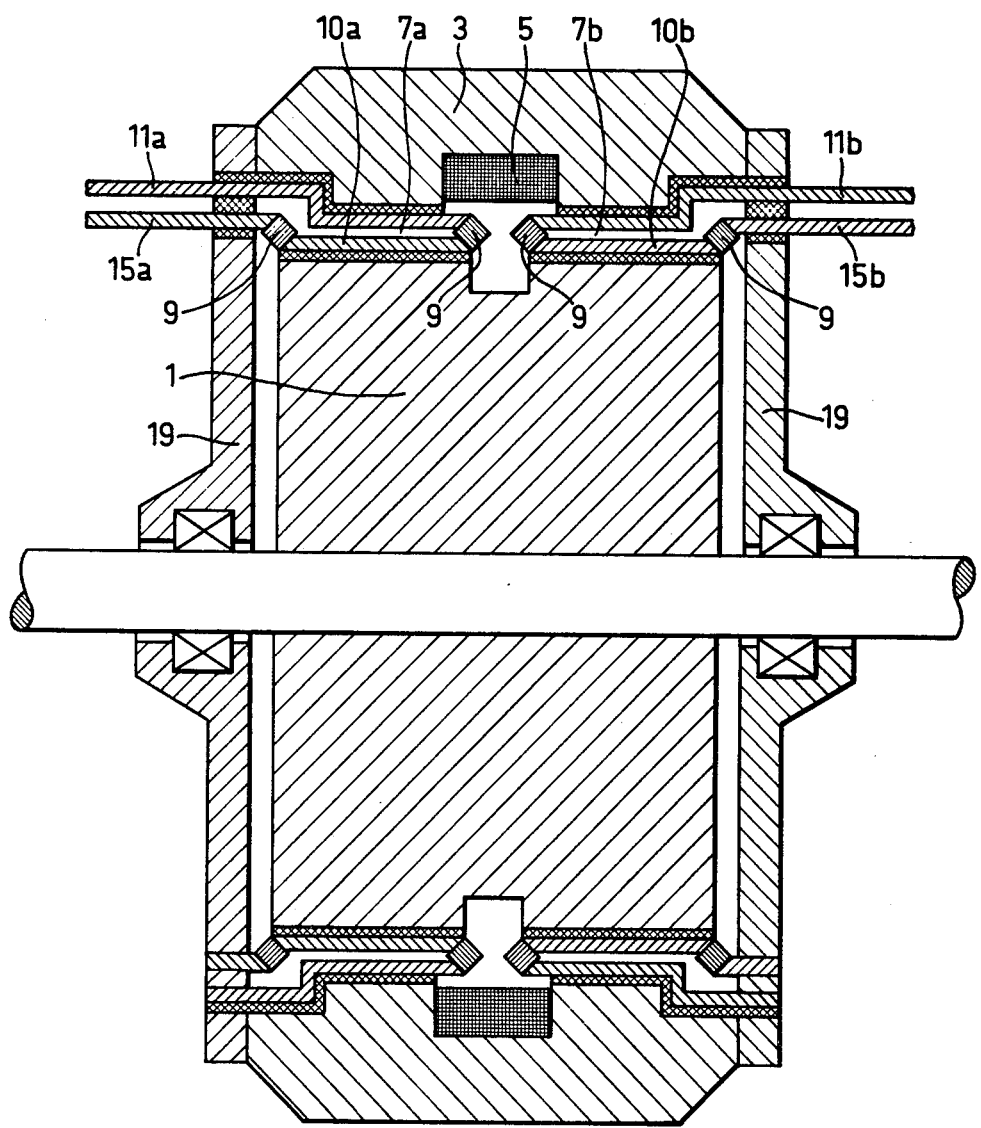
FIG. 5 is an axial section of a further embodiment which has a different magnetic circuit disposition.

In the FIG. 5 structure, the current in the two electrical circuit loops flows in opposite directions, so these loops must be separated from each other. The loop on the left is formed of conductive elements 10a and 11a connected to the leads 15a. Similar elements 10b, 11b and 15b are located on the right to provide the loop of a second electrical circuit. This necessitates four conductive rings 9 which make sliding contact with the appropriate circuit components. The two electric circuits may be connected in series or in parallel, or in any other appropriate manner. Assemblies can also be made with side-by-side units such as the one in FIG. 5, whose electric circuits are connected in series or in parallel.

Figure 4:
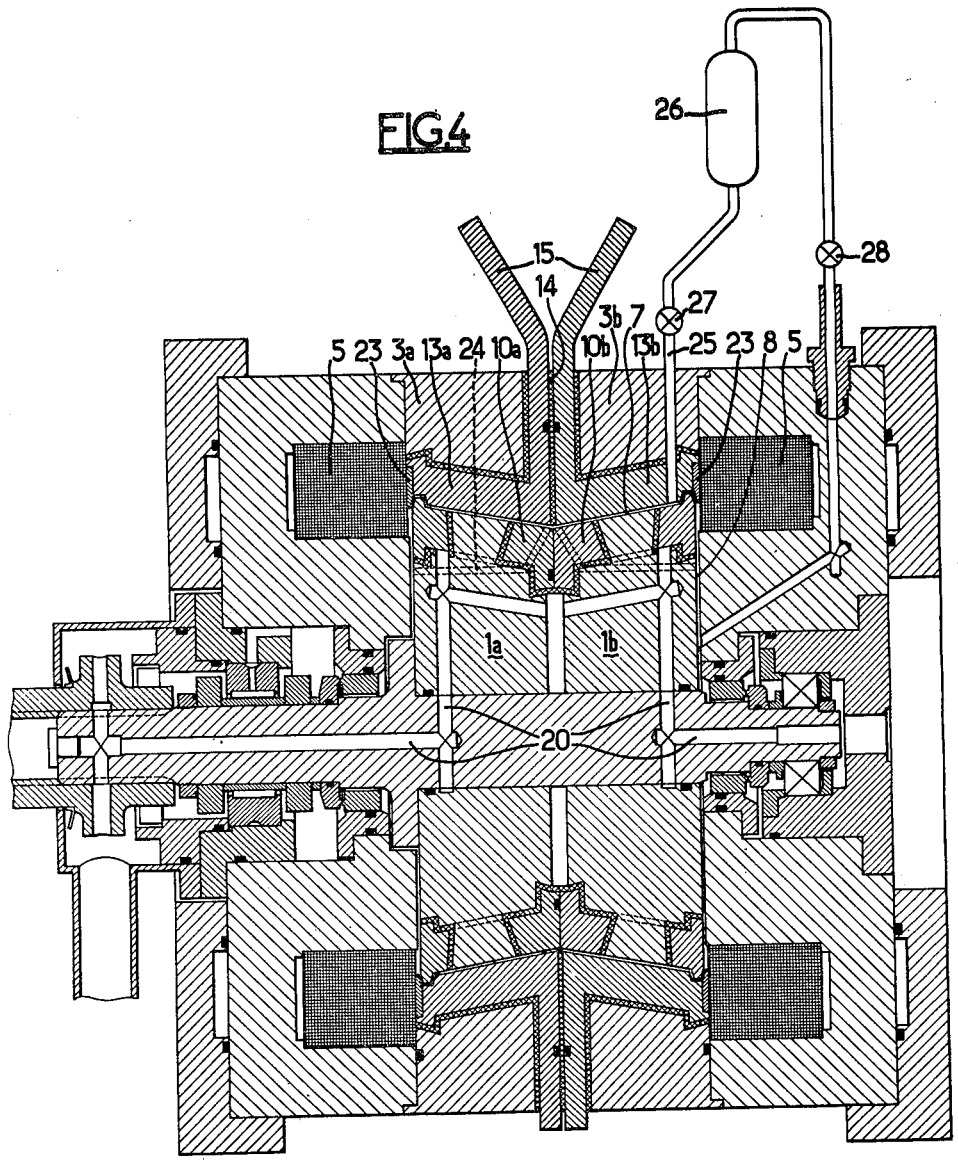
FIG. 4 is an axial section of a preferred embodiment.

While many forms of electric contacts 9 may be used, FIG. 4 shows an apparatus which uses liquid metal contacts. These are generally known and they have become increasingly popular. In FIG. 4 the clearance space 7 has a shape which, rather than being purely cylindrical, is slightly contracted in the center, preferably with a symmetrical shape made up of two truncated cones joined at their small bases. The internal peripheral surface of the stator and the external peripheral surface of the rotor are each in the form of two oppositely oriented truncated cones. An electric circuit provided by small inclined bars is preferred, but the improved electric contact means may also be used in connection with continuous conductive walls.

In FIG. 4, the stator is formed of two symmetrical sections 3a and 3b. This permits the convenient insertion of the external leads or conductors 15, and it simplifies machining of the notches and the insertion or casting of the conductor bars into the two separate stator parts which are brought together on both sides of the insulator 14.

The rotor in FIG. 4 is made in two symmetrical sections 1a and 1b to facilitate the machining of the inclined notches in accordance with the technique of FIGS. 2 and 3. This also facilitates the installation of the rotor in the stator, an installation process which otherwise would be impossible because of the shape of the respective parts.

The structure of FIG. 4 requires that the rotor's electric conductors be formed in two sections 10a and 10b, each of which is cast separately in its respective section of the rotor as explained above. In contrast to the stator sections, the electrically conductive elements of the rotor sections are brought into electrical contact with each other, but they remain electrically insulated from the magnetic rotor portions.

FIG. 4 also shows a network of conduits 20 in the rotor and its shaft for the circulation of a cooling fluid according to known techniques.

Figure 6:
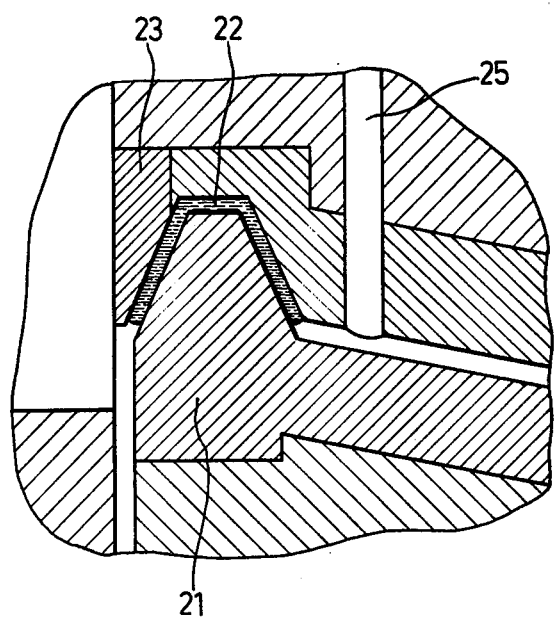
FIG. 6 is an enlarged view of the electrical contact structure used in the apparatus of FIG. 4.

Finally, the electric contact means shown in FIG. 4 involves, at the ends of the clearance 7, internally facing concave sections such as the trapezoidal section shown in detail in FIG. 6. These concave sections are filled with electrically conductive liquid metal, and they act as the terminal conductive rings for the conductive rotor pieces 10a and 10b. Each concave section is formed between a trapezoidal rib 21 on the rotor and a corresponding groove 22 of the stator. To permit installation of the rotor, groove 22 is closed by a removable annular part 23.

When the rotor shown in FIG. 4 is rotating at a high speed, centrifugal force drives the liquid in the clearance 7 toward the grooves 22. Liquid from supply conduits 24 in each rotor section flows into the end clearances 8 and into the cylindrical clearances 7, the latter connecting in the vicinity of the plane of separation between the two rotor sections. Liquid exhaust conduits 25 are drilled in the stator at the inner edge of the groove 22 closest to the axis.

When the machine of the invention is started, the spaces 7 and 8 are totally filled with liquid metal supplied by a reservoir 26 through valves 27 and 28. Since magnetohydrodynamic turbulence losses are proportional to the density of the liquid metal, a light metal with a low melting point and good electrical conductivity is desirable. A preferable metal which has such characteristics is the eutectic sodium-potassium alloy. This metal is stored in the reservoir 26 in the liquid state in the presence of a neutral atmosphere. Valves 27 and 28 are opened to totally fill the spaces 7 and 8. Gas driven out of spaces 7 and 8 by the metal enters the reservoir. After the machine has been started, the liquid metal, put into rotation by molecular force and also by electrical effects, is centrifuged toward the grooves 22. The set of conduits permits the liquid metal to escape through the conduits 25, while gases enter through conduits 24 which lead to the central dividing line of the rotor. Excess liquid metal driven centrifugally toward the grooves 22 flows into the conduits 25. Accordingly, there is no more liquid metal present than is needed to fill the grooves 22 and ensure contact by localized moistening of the relatively moving conductive parts. This procedure eliminates the losses of energy by turbulence in the clearances 7 and 8, which in normal use are only occupied by the neutral gas. This is attributed to the simple, uncomplicated shape of the elements, and it does not require expensive auxiliaries. Naturally, the same liquid metal contact system would be applicable to segmentary magnetic circuits of the type shown in FIG. 5.

Persons familiar with homopolar dynamoelectric machines will recognize that this invention may assume many forms other than the disclosed embodiments. Accordingly, it is emphasized that the invention is not limited to the disclosed structures but embraces a wide variety of devices which fall within the spirit of the following claims.

I claim:

1. A homopolar machine, comprising, a stator and a rotor with magnetic portions and a generally cylindrical clearance space between the stator and rotor, means for producing a magnetic flux which moves through a magnetic circuit which extends across said clearance space and through said magnetic portions of the stator and rotor, nonmagnetic electrically conductive elements which extend along the stator and rotor and are electrically insulated from said magnetic portions of the stator and rotor, said conductive elements on said rotor including axially spaced continuous rings and a first set of radially spaced bars, said bars being located in notches on the rotor, said rotor having magnetic portions which project between adjacent said bars and confront said clearance space to minimize the thickness of the clearance space, said conductive elements on said sensor including axially spaced continuous rings and a second set of radially spaced bars, one said set of bars being arranged parallel to the axis of the machine, and the other said set of bars being inclined to the axis of the machine, said other set of bars being formed of two bar sections which are of equal cross section and are equally inclined in opposite directions relative to the axis of the machine, electrical contact means electrically connecting the conductive elements of the rotor to the conductive elements of the stator to form an electrically conductive loop which has no magnetic element therewithin.

2. The apparatus of claim 1 wherein there is a gap in the electrically conductive loop, said apparatus including electric conductors connected to and leading from the electrically conductive loop on opposite sides of said gap.

3. The apparatus of claim 1 or claim 2 wherein the electrical contact means uses a liquid metal in the electrically conductive loop, said clearance space having a reduced radius toward the center of its length, and terminating at each end of its axial length in an internally facing concave section, means for initially filling the clearances between the stator and the rotor with a liquid metal, and means operable when the rotor is rotating for evacuating liquid metal from said clearances except for the metal filling the said concave sections.

4. The apparatus of claim 3 wherein the internal peripheral surface of the stator and the external peripheral surface of the rotor are each in the form of two oppositely oriented truncated cones.

5. The apparatus of claim 3 wherein a peripheral rib on the rotor and a corresponding groove on the stator define said concave section of the clearance space.

6. The apparatus of claim 5 wherein the concave section of the clearance space is trapezoidal.

7. The apparatus of claim 3 wherein the liquid evacuating means includes centrifugal overflow passages connected to the clearance spaces near the edges of the concave sections.

* * * * *